(12) United States Patent
Kodeboyina et al.

(10) Patent No.: US 7,986,695 B1
(45) Date of Patent: Jul. 26, 2011

(54) AUTOMATIC SELECTION OF SITE-IDS FOR VIRTUAL PRIVATE NETWORKS

(75) Inventors: Chaitanya Kodeboyina, Santa Clara, CA (US); Kireeti Kompella, Los Altos, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 742 days.

(21) Appl. No.: 11/329,371

(22) Filed: Jan. 10, 2006

(51) Int. Cl.
*H04L 12/56* (2006.01)
(52) U.S. Cl. ........................................ 370/392; 380/282
(58) Field of Classification Search .................. 370/392, 370/401; 380/282, 44
See application file for complete search history.

(56) References Cited

U.S. PATENT DOCUMENTS 5,131,007 A * 7/1992 Brown et al. ................. 375/267
7,181,017 B1 * 2/2007 Nagel et al. ................... 380/282
2003/0099261 A1 * 5/2003 Jacobsen et al. ............. 370/542
2004/0059829 A1 * 3/2004 Chu et al. ...................... 709/238
2007/0047557 A1 * 3/2007 Martini et al. ........... 370/395.53
2007/0115985 A1 * 5/2007 Choudhury et al. .......... 370/392

* cited by examiner

*Primary Examiner* — Dang T Ton
*Assistant Examiner* — Wei Zhao
(74) *Attorney, Agent, or Firm* — Shumaker & Sieffert, P.A.

(57) ABSTRACT

Techniques are described for automatically selecting virtual private network (VPN) site-IDs for each customer site within a VPN established over a network. The techniques described herein enable a network router within a VPN to automatically allocate unique site-IDs for each customer site included in the VPN in a dense manner. In some cases, the VPNs may comprise virtual private local area network (LAN) service (VPLS) domains that transmit layer two (L2) traffic between customer sites, i.e., VPLS sites, via the network. For example, a network service provider may configure a network device, such as a router, to belong to one or more VPNs. When a customer site within one of the VPNs connects to the router, the router configures the customer site on the router. The router then automatically selects a site-ID for the customer site configured on the router.

56 Claims, 8 Drawing Sheets

AUTOMATIC SELECTION OF SITE-IDS FOR VIRTUAL PRIVATE NETWORKS

TECHNICAL FIELD

The invention relates to computer networks and, more particularly, to virtual private networks (VPNs) established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Network service providers may deploy virtual private networks (VPNs) to extend two or more remote customer sites through a public network, such as the Internet, as if the public network does not exist. In a typical configuration, routers coupled to the customer sites define label switched paths (LSPs) within the public network to transmit traffic between the customer sites that belong to the same VPN. In some cases, a network service provider may deploy a virtual private local area network (LAN) service (VPLS) domain that comprises a point-to-multipoint layer two (L2) VPN established over the public network. VPLS domains are instantiations of emulated LANs. For example, VPLS domains transport L2 traffic (e.g., Ethernet packets) between customer sites via the public network as if the customer sites are included in the same LAN.

The routers coupled to the customer sites may then automatically signal pseudo-wires to carry traffic across the LSPs to other routers within the same VPNs. For each customer site configured on a given router, the network service provider manually configures a route distinguisher (RD), a route target (RT) that identifies the VPN of the customer site, and a site-ID used to uniquely identify the customer site within the VPN. However, manually configuring a unique site-ID for each customer site of each VPN established over the network presents a large burden on resources of the network service provider and may be prone to error.

SUMMARY

In general, the invention is directed to techniques for automatically selecting virtual private network (VPN) site-IDs for customer sites of a VPN established over a network. The network may comprise a public network, such as the Internet. The techniques described herein enable a network device within a VPN to automatically allocate unique site-IDs for each customer site of the VPN configured on the network device in a dense manner. In this way, the techniques ease the burden on the network service provider to manually configure the site-IDs for each of the VPNs established over the network. In some cases, the VPNs may comprise virtual private local area network (LAN) service (VPLS) domains that transmit layer two (L2) traffic between customer sites via the network. VPLS domains extend two or more remote customer sites through the network as if the customer sites were included in the same LAN.

A network service provider may configure a network device, such as a router, to belong to one or more VPNs. The router receives and maintains information, such as VPN site-IDs, from other routers in the network that belong to the same VPNs. When a customer site of one of the VPNs connects to the router, the router configures the customer site on the router. The router automatically selects a site-ID for the customer site configured on the router from a set of unused site-IDs for the VPN. If another router in the network attempts to select the same site-ID, a "collision" occurs. The router than performs collision resolution procedures to resolve the collision. The router may either use the selected site-ID for the customer site or select another site-ID based on the resolution of the collision.

In one embodiment, a method comprises receiving advertisements with a first network device from a plurality of other network devices within a VPN to which the first network device belongs, wherein the advertisements include site-IDs for customer sites of the VPN configured on the plurality of other network devices. The method also includes configuring a first customer site of the VPN on the first network device and automatically selecting a unique site-ID for the first customer site of the VPN based on the received advertisements.

In another embodiment, a computer-readable medium comprises instructions that cause a programmable processor to receive advertisements with a first network device from a plurality of other network devices within a VPN to which the first network device belongs, wherein the advertisements include site-IDs for customer sites of the VPN configured on the plurality of other network devices. The computer-readable medium further includes instructions that cause the programmable processor to configure a first customer site of the VPN on the first network device and automatically select a unique site-ID for the first customer site of the VPN based on the received advertisements.

In another embodiment, a first network device comprises a control unit that receives advertisements from a plurality of other network devices within a VPN to which the first network device belongs, wherein the advertisements include site-IDs for customer sites of the VPN configured on the plurality of other network devices. The first network device also comprises a VPN module included in the control unit that configures a first customer site of the VPN on the first network device, and a site-ID allocation module included in the control unit that automatically selects a unique site-ID for the first customer site of the VPN based on the received advertisements.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
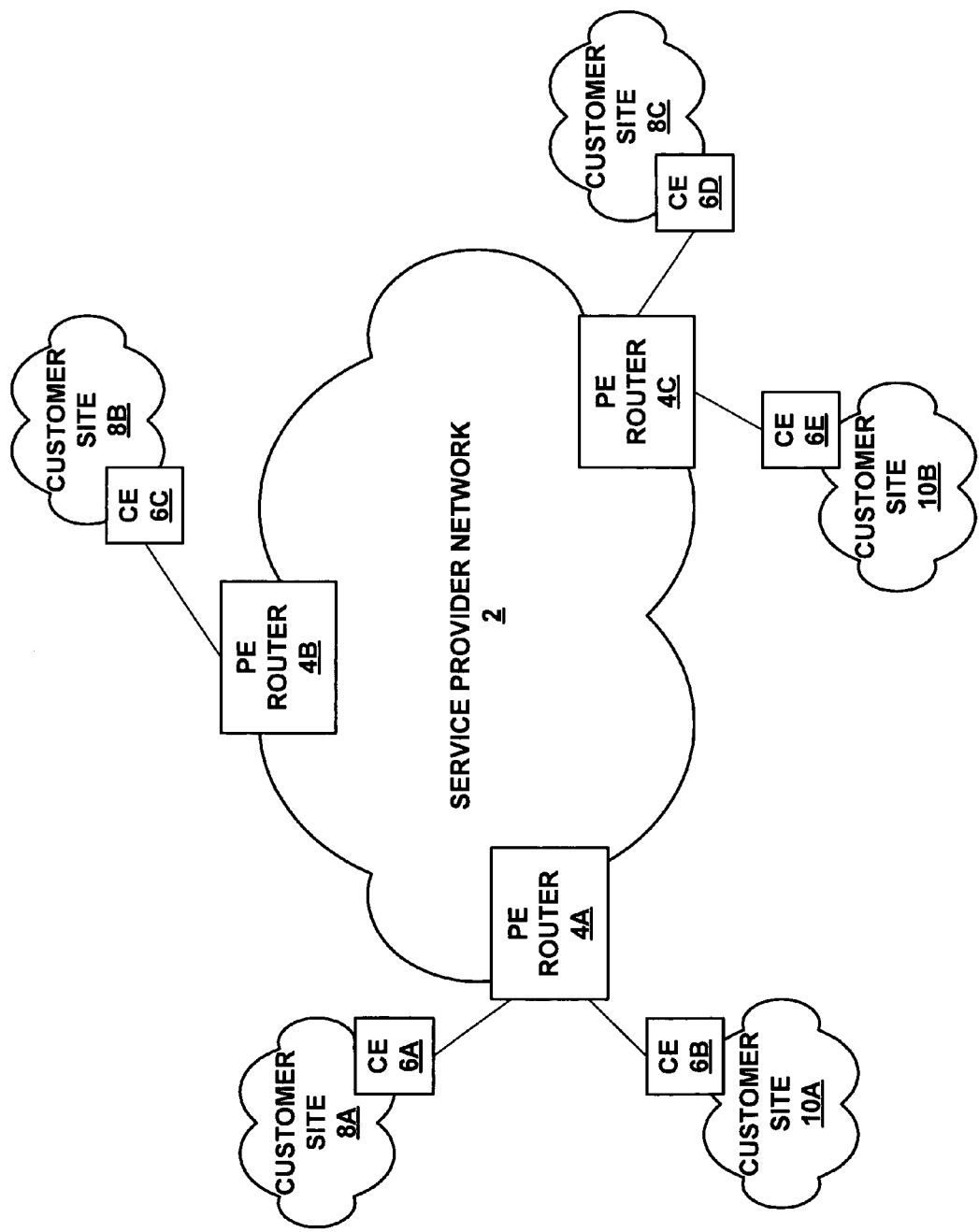
FIG. 1 is a block diagram illustrating an exemplary service provider (SP) network including provider edge (PE) routers coupled to one or more customer sites.

FIG. 1 is a block diagram illustrating an exemplary service provider (SP) network 2 including provider edge (PE) routers 4A-4C ("PE routers 4") coupled to one or more customer sites. SP network 2 may comprise the Internet or another public network. In some cases, SP network 2 may comprise a multi-protocol label switching (MPLS) network. In the illustrated embodiment, a network service provider establishes virtual private networks (VPNs) over SP network 2 to extend two or more remote customer sites through SP network 2 as if the customer sites are included in the same site. In other embodiments, the VPNs may comprise virtual private local area network (LAN) service (VPLS) domains that transmit layer two (L2) traffic between the customer sites via SP network 2. The VPLS domains may extend two or more remote customer sites through SP network 2 as if the customer sites were included in the same LAN.

The network service provider configures each of PE routers 4 to belong to one or more of the VPNs established over SP network 2. For example, the network service provider configures PE routers 4A-4C to belong to a first VPN and configures PE routers 4A and 4C to belong to a second VPN. In the illustrated embodiment, customer sites 8A-8C ("customer networks 8") comprise VPN sites of the first VPN and customer sites 10A and 10B ("customer sites 10") comprise VPN sites of the second VPN. Each of customer sites 8 and 10 may include a local area network (LAN) or a wide area network (WAN) that comprises a plurality of subscriber devices, such as desktop computers, laptops, workstations, PDAs, wireless devices, network-ready appliances, file servers, print servers or other devices. PE routers 4 may define label switched paths (LSPs) within SP network 2 to connect the PE routers 4 to one another. PE routers 4 couple to customer sites 8 and 10 via customer edge (CE) routers 6A-6E ("CE routers 6"). For example, PE router 4A is coupled to customer site 8A via CE router 6A and customer site 10A via CE router 6B. PE router 4B is coupled to customer site 8B via CE router 6C. PE router 4C is coupled to customer site 8C via CE router 6D and customer site 10B via CE router 6E. In this way, the first VPN provides connectivity between customer sites 8 via PE routers 4A-4C and the second VPN provides connectivity between customer sites 10 via PE routers 4A and 4C.

PE routers 4 advertise their VPN memberships to the other PE routers 4 of SP network 2 using the border gateway protocol (BGP), the label distribution protocol (LDP), or another routing protocol. In this way, each of PE routers 4 in SP network 2 has a complete view of the VPN domain memberships of the other PE routers. Upon receiving the VPN membership advertisements, each of PE routers 4 may signal pseudo-wires across the LSPs within SP network 2 to carry traffic between the one of PE routers 4 and the other PE routers 4 that belong to the same VPN.

In accordance with an embodiment of the invention, PE routers 4 within a given VPN may automatically select unique VPN site-IDs for each customer site of the VPN configured on PE routers 4 in a dense manner. For example, PE router 4A may automatically select a site-ID for customer network 8A that is different than a site-ID for customer site 8B and a site-ID for customer site 8C. In addition, PE router 4A may automatically select the site-ID for customer site 8A to be substantially dense with the site-IDs for customer sites 8B and 8C of the first VPN. In this way, PE routers 4 may ease the burden on the network service provider to manually configure site-IDs for each of the VPNs established over SP network 2.

As an example, PE router 4A receives advertisements from the other PE routers 4 that belong to the same VPNs as PE router 4A. The received advertisements may include site-IDs for customer networks of the VPNs configured on the other PE routers 4. When customer site 8A of the first VPN connects to PE router 4A, PE router 4A configures customer site 8A on PE router 4A. PE router 4A then automatically selects a site-ID for customer site 8A configured on PE router 4A from a set of unused site-IDs for the first VPN. If one of the other PE routers 4 in SP network 2 attempts to select the same site-ID, a "collision" occurs. PE router 4A may than perform collision resolution procedures to resolve the collision. PE router 4A may either use the selected site-ID for customer site 8A or select another site-ID based on the resolution of the collision.

The automatic VPN site-ID selection techniques described herein may be backward compatible with conventional manual configuration techniques. In other words, the network system provider may manually configure site-IDs for some customer sites of a given VPN and PE routers within the VPN may automatically select site-IDs for other customer sites of the same VPN. This backward compatibility enables non-unique site-IDs to be manually configured for customer sites. For example, in the case of a multi-homed customer site connected to two or more of PE routers 4. In this case, the same site-ID may be used on each of the two or more PE routers 4 to which the customer site is attached.

In the illustrated embodiment, PE routers 4 within a given VPN may automatically select site-IDs for customer sites of the VPN, which is established across a single autonomous system, i.e., SP network 2. In other embodiments, the automatic site-ID selection techniques may be extended to PE routers within a VPN established across multiple autonomous systems.

Figure 2:
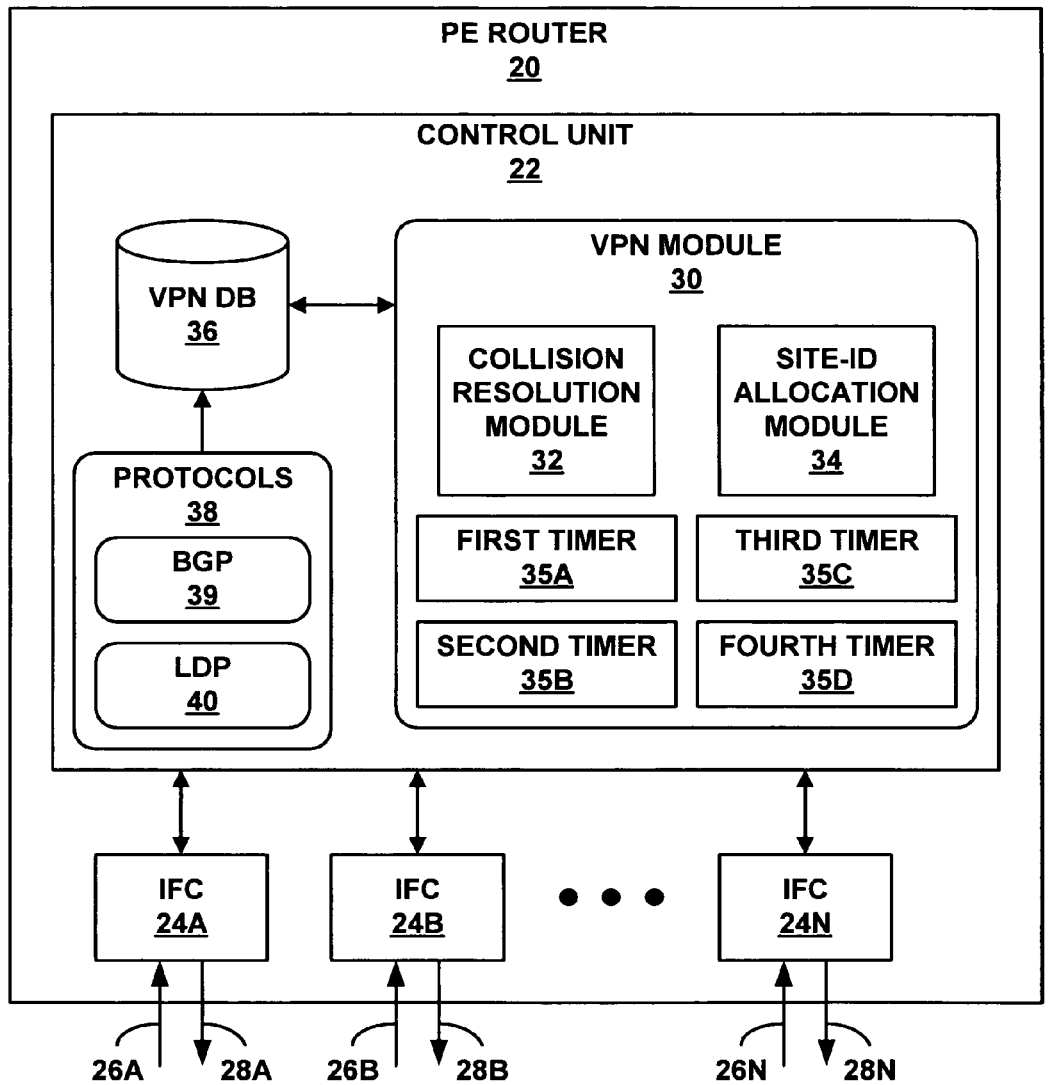
FIG. 2 is a block diagram illustrating an exemplary PE router capable of automatically generating site-IDs for customer sites of a VPN in accordance with an embodiment of the invention.

FIG. 2 is a block diagram illustrating an exemplary PE router 20 capable of automatically generating site-IDs for customer sites of a VPN in accordance with an embodiment of the invention. PE router 20 may operate substantially similar to any of PE routers 4 from FIG. 1. A network service provider may configure PE router 20 to belong to one or more VPNs. In some embodiments, the VPNs may comprise VPLS domains.

In this example, PE router 20 includes interface cards 24A-24N ("IFCs 24") that receive packets via inbound links 26A-26N ("inbound links 26") and send packets via outbound links 28A-28N ("outbound links 28"). IFCs 24 are typically coupled to links 26, 28 via a number of interface ports. PE router 20 also includes a control unit 22 that determines routes of received packets and forwards the packets accordingly via IFCs 24.

Control unit 22 maintains routing information (not shown) that describes the topology of a network and, in particular, routes through the network. The routing information may include, for example, route data that describes various routes within the network, and corresponding next-hop data indicating appropriate neighboring devices within the network for each of the routes. Router 20 updates the routing information to accurately reflect the topology of the network.

Control unit 22 also maintains forwarding information (not shown) that associates network destinations with specific next-hops and corresponding interface ports. In general, when router 20 receives a packet via one of inbound links 26, control unit 22 determines a destination and associated next-hop for the packet in accordance with the routing information and forwards the packet on one of outbound links 28 to the corresponding next-hop in accordance with the forwarding information based on the destination of the packet.

Control unit 22 includes a VPN module 30, a VPN database 36, and an operating environment for protocols 38 to execute. In the illustrated embodiment, protocols 38 include BGP 39 and LDP 40. In other embodiments, protocols 38 may include other routing protocols. VPN module 30 includes a collision resolution module 32, a site-ID allocation module 34, and timers 35A-35D. In other embodiments, collision resolution module 32, site-ID allocation module 34, and timers 35A-35D may comprise individual components within control unit 22 coupled to VPN module 30.

Upon start up, control unit 22 advertises the VPN memberships of PE router 20 to other PE routers within the service provider network using BGP 39, LDP 40, or another routing protocol. Control unit 22 also receives advertisements from the other PE routers that belong to the same VPNs as PE router 20. The advertisements may include site-IDs, control flags, label block sizes, local preferences, and next-hop values.

VPN module 30 may configure a customer site on the newly active PE router 20 for each customer site of the VPNs to which PE router 20 belongs that is connected to PE router 20. PE router 20 may then wait a first period of time to ensure that control unit 22 receives substantially all the advertisements from the other PE routers. The first period of time may be based on a first timer 35A or an implementation of specific heuristics. For example, first timer 35A may determine the period of time that PE router 20 waits upon start up to receive advertisements from the other PE routers within the VPNs to which PE router 20 belongs. If heuristics are implemented, PE router 20 may terminate its wait before the first period of time expires. For example, if BGP end-of-rib marker functionality is implemented, control unit 22 knows when PE router 20 has received all of the advertisements from the other PE routers.

Similarly, VPN module 30 may configure a new customer site of a specific VPN to which PE router 20 belongs when PE router 20 is currently active. PE router 20 may then wait a second period of time to ensure that control unit 22 receives substantially all the advertisements from the other PE routers within the specific VPN. The second period of time may be based on a second timer 35B or an implementation of specific heuristics. For example, second timer 35B may determine the period of time that PE router 20 waits upon configuring the new customer site to receive advertisements from the other PE routers within the specific VPN. Again, if heuristics are implemented, PE router 20 may terminate its wait before the second period of time expires. A larger number of advertisements may need to be received upon configuring a customer site on a newly active PE router than on a currently active PE router. Therefore, the first period of time may be longer than the second period of time.

Site-ID allocation module 34 within control unit 22 stores the information within the advertisements received from the other PE routers in VPN database 36. One of protocols 38 may be used to update VPN database 36 with the received advertisements. Site-ID allocation module 34 also generates a set of unused site-IDs for each VPN to which PE router 20 belongs. For example, the received advertisements include site-IDs allocated, either manually or automatically, to customer sites of the VPNs configured on the other PE routers. Site-ID allocation module 34 may generate a list of used site-IDs based on the received advertisements and compare the set of used site-IDs to a set of potential site-IDs for each of the VPNs. In this way, site-ID allocation module 34 may automatically select unique site-IDs for newly configured customer networks from a set of unused site-IDs for each of the corresponding VPNs.

Once VPN module 30 configures the customer site on PE router 20, site-ID allocation module 34 determines if the customer site comprises a manually configured site-ID. If the network service provider has not manually configured a site-ID, site-ID allocation module 34 selects a site-ID for the customer network of the specific VPN from the set of unused site-IDs for the specific VPN. Site-ID allocation module 34 may select the site-ID for the customer network to be substantially dense with the site-IDs included in the received advertisements. In some cases, site-ID allocation module 34 selects the site-ID from the set of unused site-IDs for the specific VPN in a sequential manner such that the unused site-ID with the smallest value is selected. In other cases, site-ID allocation module 34 selects the site-ID from a portion of the set of unused site-IDs for the specific VPN in a random manner. For example, site-ID allocation module 34 may randomly select the site-ID from a chosen number of sequential site-IDs included in the set of unused site-IDs.

Control unit 22 then transmits a "claim" advertisement for the selected site-ID from PE router 20 to the other PE routers that belong to the specific VPN. The claim advertisement includes a zero label block size. In this way, PE router 20 may attempt to claim the selected site-ID for the customer site before the other PE routers signal pseudo-wires to the customer site.

After transmitting the claim advertisement for the selected site-ID, collision resolution module 32 determines whether a collision occurs based on advertisements received from the other PE routers within the specific VPN. PE router 20 may wait a fourth period of time to ensure that control unit 22 does not receive an advertisement from one of the other PE routers within the specific VPN that includes a site-ID that is the same as the selected site-ID. The fourth period of time may be based on a fourth timer 35D or an implementation of specific heuristics. For example, fourth timer 35D may determine the period of time that PE router 20 waits upon transmitting the claim advertisement to detect a site-ID collision based on the advertisements received from the other PE routers within the specific VPN. Again, if heuristics are implemented, PE router 20 may terminate its wait before the fourth period of time expires.

If collision resolution module 32 does not receive any advertisements including the same site-ID, the control unit 22 transmits a "real" advertisement for the selected site-ID from PE router 20 to the other PE routers within the specific VPN. The real advertisement includes a non-zero label block size that enables the other PE routers to signal pseudo-wires to the customer site. Control unit 22 may then use the selected site-ID for the customer site of the specific VPN configured on PE router 20.

If collision resolution module 32 included in control unit 22 detects a collision during the fourth period of time, collision resolution module 32 performs collision resolution procedures. Even after control unit 22 starts using the selected site-ID, collision resolution module 32 may still detect one of the other PE routers using the same site-ID. For example, this may occur if two PE routers attempt to claim the same site-ID, but for some reason do not detect the collision during the period of time for the claim advertisements.

Upon detecting a collision between the claim advertisement transmitted from PE router 20 and a received advertisement from one of the other PE router, collision resolution module 32 performs several comparisons between the two advertisements. First, collision resolution module 32 compares values of configuration flags within both of the advertisements. The configuration flags include 'A' bit values that indicate whether the site-ID included in the associated advertisement is manually configured by the network service provider, i.e., A=0, or automatically selected by a PE router, i.e., A=1. If the two advertisements have different 'A' bit values, collision resolution module 32 resolves the collision in favor of the PE router with the advertisement that includes the manually configured site-ID with A=0.

When both advertisements include either manually configured site-IDs or automatically selected site-IDs, collision resolution module 32 compares types of label blocks within both of the advertisements. The types of label blocks indicate whether the associated advertisement is a claim advertisement with a label block size of zero, or a real advertisement with a non-zero label block size. If the two advertisements have different types of label blocks, collision resolution module 32 resolves the collision in favor of the PE router with the real advertisement that includes a non-zero label block size.

When both advertisements comprise either real advertisements or claim advertisements, collision resolution module 32 compares local preference values within both of the advertisements. If the two advertisements have different local preference values, collision resolution module 32 resolves the collision in favor of the PE router with the advertisement that includes the higher local preference value.

When both advertisements have the same local preference value, collision resolution module 32 compares next-hop values within both of the advertisements. The next-hop values comprise addresses of next-hop destination devices, such that each next-hop value is a unique value. Therefore, collision resolution module 32 resolves the collision in favor of the PE router with the advertisement that includes the lower next-hop value. When collision resolution module 32 resolves the collision in favor of PE router 20, control unit 22 uses the selected site-ID for the customer site of the specific VPN configured on PE router 20. When collision resolution module 32 does not resolve the collision in favor of PE router 20, control unit 22 withdraws the claim advertisement for the site-ID, and site-ID allocation module 34 selects a new site-ID for the customer site from the set of unused site-IDs for the specific VPN.

Site-ID allocation module 34 may adapt procedures to reduce the chance of collisions when selecting unique site-IDs. For example, site-ID allocation module 34 may randomly select a site-ID from a portion of the set of unused site-IDs instead of sequentially selecting the unused site-ID with the lowest value. Site-ID allocation module 34 may also use heuristics designed to minimize the number of label blocks per VPN. For example, site-ID allocation module 34 may select a site-ID that falls within a range of site-IDs included in advertisements received from the other PE routers.

In some cases, site-ID allocation module 34 may initiate more aggressive selection procedure after an unfavorable collision resolution. For example, site-ID allocation module 34 may randomly select a site-ID for a customer site from a larger set of unused site-IDs that may fall outside of a range of the site-IDs advertised by the other PE routers. This may force the other PE routers to extend existing label blocks or allocate new label blocks to encompass the selected site-ID. Furthermore, site-ID allocation module 34 may implement a back-off strategy with each unfavorable collision resolution in order to further reduce the chance of a collision.

When PE router 20 shuts down, control unit 22 withdraws all the advertisements for the customer sites configured on PE router 20. The other PE routers that belong to the same VPNs as PE router 20 may then release the site-IDs of the customer networks to the set of unused site-IDs for the each corresponding VPN. In some embodiments, the other PE routers may wait a third period of time before releasing the site-IDs to enable PE router 20 to restart without losing the site-IDs of the customer sites. If PE router 20 restarts before the third period of time expires, the other PE routers allow site-ID allocation module 34 to reclaim the previously used site-ID for the customer sites.

The third period of time may be based on a third timer or an implementation of specific heuristics within each of the other PE routers. The third timer within each of the other PE routers may be substantially similar to third timer 35C within PE router 20. For example, the third timer may determine the period of time that each of the other PE routers wait before releasing the site-IDs included in the withdrawn advertisements. Again, if heuristics are implemented, the other PE routers may terminate their wait before the third period of time expires. In this way, the other PE routers within the service provider network may reduce an amount of flux caused by PE router 20 restarting.

If all of a plurality of interfaces that connect a customer site to PE router 20 are disconnected, control unit 22 may signal the interface disconnect to the other PE routers that belong to the VPN of the customer site. Control unit 22 may re-transmit the advertisement for the customer site with a disconnect flag. For example, the disconnect flag may comprise a 'D' bit that indicates that at least one of the plurality of interfaces is connected when set to a value of zero and indicates that all of the plurality of interfaces are disconnected when set to a value of one. In another embodiment, control unit 22 may signal the interface disconnect to the other PE routers that belong to the VPN of the customer site when at least one of the plurality of interfaces that connect the customer site to PE router 20 is disconnected. Control unit 22 may re-transmit the advertisement for the customer site with a disconnect flag. For example, the disconnect flag may comprise a 'D' bit that indicates that all of the plurality of interfaces are connected when set to a value of zero and indicates that at least one of the plurality of interfaces is disconnected when set to a value of one.

Upon receiving the re-transmitted advertisement with the disconnect flag, the other PE routers that belong to the VPN remove the pseudo-wires coupled to PE router 20. The other PE routers within the VPN continue to maintain the site-ID of the VPLS site on PE router 20 in the set of used site-IDs for the VPN even while all of the plurality of interfaces between the customer site and PE router 20 are disconnected. In this way, the other PE routers within the VPN consider the site-ID of the customer site included in the re-transmitted advertisement to still be in use.

However, since the disconnect flag may not be understood by some PE routers with older versions of software, a configurable knob may be provided in the PE routers with newer versions of software for backward compatibility. The configurable knob may enable forced withdrawal of the advertisements when all of the plurality of interfaces connecting the customer site to PE router 20 are disconnected.

Figure 3:
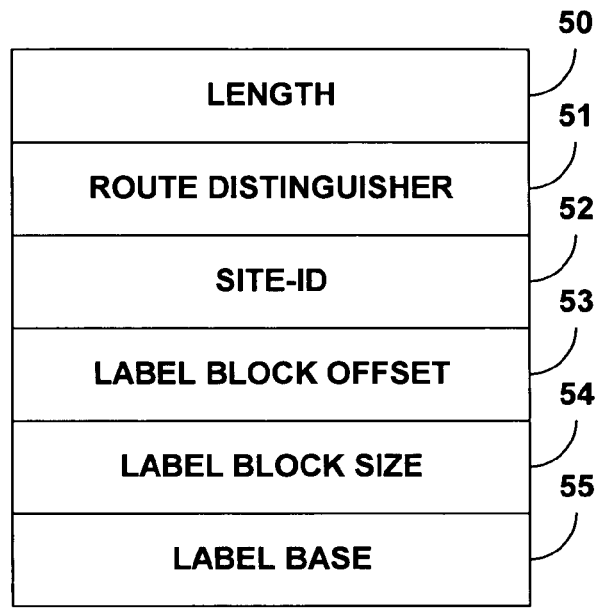
FIG. 3 illustrates an exemplary BGP encoding of network layer reachability information (NLRI) for VPLS information.

FIG. 3 illustrates an exemplary BGP encoding of network layer reachability information (NLRI) for VPLS information. In this example, the BGP NLRI is associated with an L2 VPN address family identifier (AFI) and a VPLS subsequent address family identifier (SAFI). The BGP NLRI comprises at least a portion of a BGP advertisement sent from a PE router, such as PE router 20 from FIG. 2, to a plurality of other PE routers within a VPLS domain to which PE router 20 belongs. As described above, BGP advertisements may be used to exchange VPLS domain membership information of PE routers and site-IDs for customer sites configured on the PE routers. When the ingress PE router distributes this information, the BGP advertisement includes an L2 information extended community attribute.

The BGP NLRI includes a length field 50, a route distinguisher (RD) field 51, a site-ID field 52, a label block offset field 53, a label block size field 54, and a label base field 55. Length field 50 comprises two octets, RD field 51 comprises eight octets, site-ID field 52 comprises two octets, label block offset field 53 comprises two octets, label block size field 54 comprises two octets, and label base field 55 comprises three octets.

RD field 51 defines a unique route distinguisher (RD) for a customer site configured on PE router 20. The unique RD will prevent BGP route reflectors (RRs) from inadvertently filtering VPLS advertisements that the PE router 20 needs to receive. In some cases, PE router 20 may automatically generate the unique RD. Site-ID field 52 defines a site-ID for a customer site that a PE router may use to index into a label block received from the plurality of other PE routers within the VPLS domain to which PE router 20 belongs to retrieve pseudo-wire labels for pseudo-wires that transport traffic across a network. The label block may be defined based on information within label block offset field 53, label block size field 54, and label base field 55.

Figure 4:
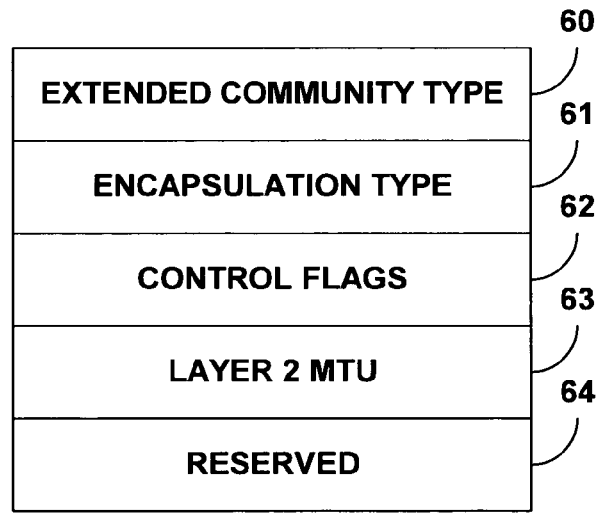
FIG. 4 illustrates an L2 information extended community attribute used to signal pseudo-wires between PE routers within a given VPLS domain.

FIG. 4 illustrates an L2 information extended community attribute used to signal pseudo-wires between PE routers within a given VPLS domain. As described above, a BGP advertisement sent from a PE router, such as PE router 20 from FIG. 2, to a plurality of other PE routers within a VPN to which PE router 20 belongs may include the L2 information extended community attribute.

The L2 attribute includes an extended community type field 60, an encapsulation type field 61, control flags field 62, an L2 maximum transmission unit (MTU) field 63, and a reserved field 63. Extended community type field 60 comprises two octets, encapsulation type field 51 comprises one octet, control flags field 62 comprises one octet, L2 MTU field 63 comprises two octets, and reserved field 64 comprises two octets.

Encapsulation type field 61 defines a type of encapsulation supported on the pseudo-wires. In the case of a VPLS domain, the pseudo-wires emulate a LAN across the network and support the Ethernet encapsulation type. Control flags field 62 includes a vector of one or more control flag bits that define control information regarding the pseudo-wires. L2 MTU field 63 defines the maximum transmission unit to be used on the pseudo-wires.

Figure 5:
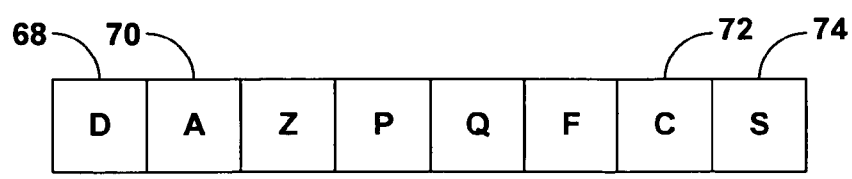
FIG. 5 illustrates the control flags bit vector included in control flags field of an L2 information extended community attribute from FIG. 4

FIG. 5 illustrates the control flags bit vector included in control flags field 62 of the L2 information extended community attribute from FIG. 4. In the illustrated example, the control flags bit vector comprises eight bit flags. The 'D' bit 68 comprises a disconnect flag that indicates whether all of a plurality of interfaces between the customer site and the PE router are disconnected. 'D' bit 68 indicates that at least one of the plurality of interfaces is connected when set to a value of zero. 'D' bit 68 indicates that all of the plurality of interfaces are disconnected when set to a value of one. In other embodiments, "D" bit 68 may indicate that all of the plurality of interfaces are connected when set to a value of zero, and indicate that at least one of the plurality of interfaces is disconnect when set to a value of one.

The 'A' bit 70 comprises a configuration flag that indicates whether the site-ID included in site-ID field 52 of the BGP NLRI described above is manually configured by the network service provider or automatically selected by a PE router. 'A' bit 70 indicates a manually configured site-ID for the customer site when set to a value of zero. 'A' bit 70 indicates an automatically selected site-ID for the customer site when set to a value of one.

The 'C' bit 72 comprises a control word flag that indicates whether a control word must be included when sending VPLS packets to the PE router. 'C' bit 72 indicates that a control word need not be present when set to a value of zero. 'C' bit 72 indicates a control work must be present when set to a value of one. The 'S' bit 74 comprises a sequence flag that indicates whether a sequenced delivery of frames is required when sending VPLS packets to the PE router. 'S' bit 74 indicates that a sequenced delivery of frames is not required when set to a value of zero. 'S' bit 74 indicates that a sequenced delivery of frames is required when set to a value of one. The remaining flag bits (Z, P, Q, and F) within the control flag bit vector may be set to zero.

Figure 6A:
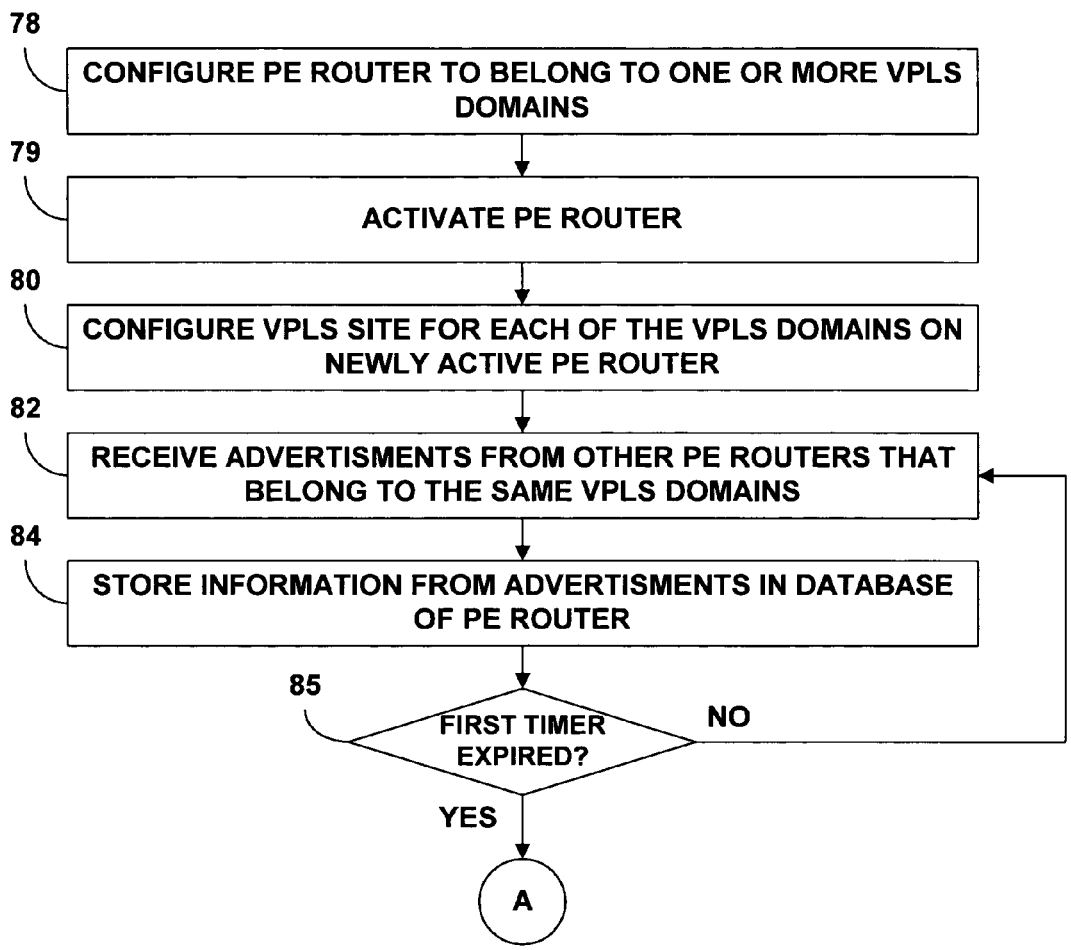
FIGS. 6A-6C are flowcharts illustrating an exemplary process of automatically selecting a site-ID for a customer site of a VPLS domain.
Figure 6B:
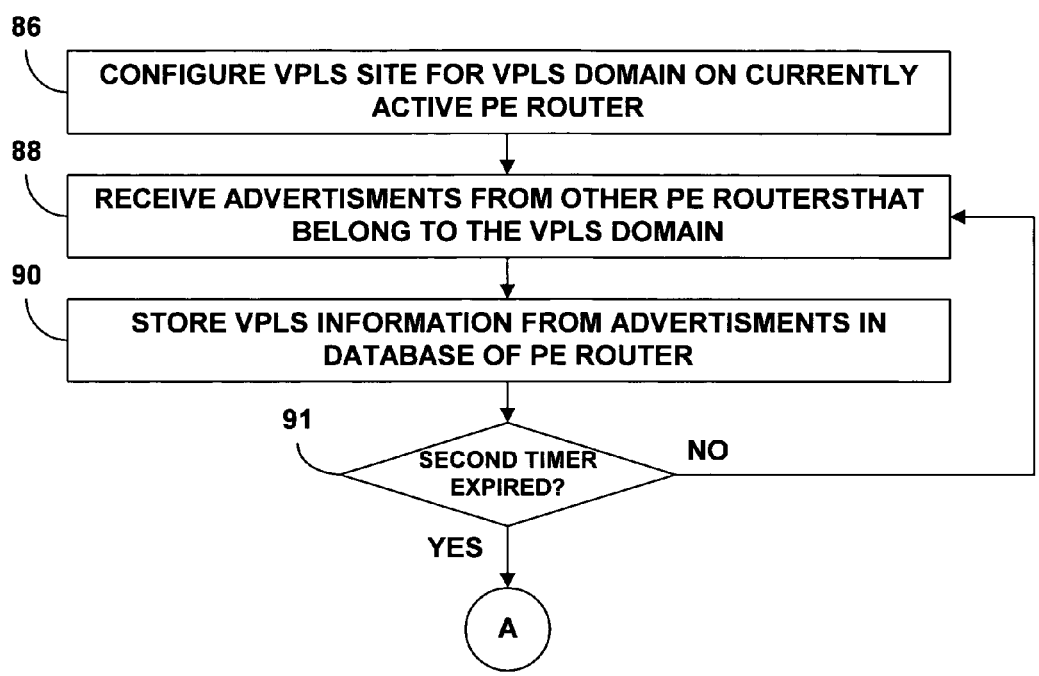
Figure 6C:
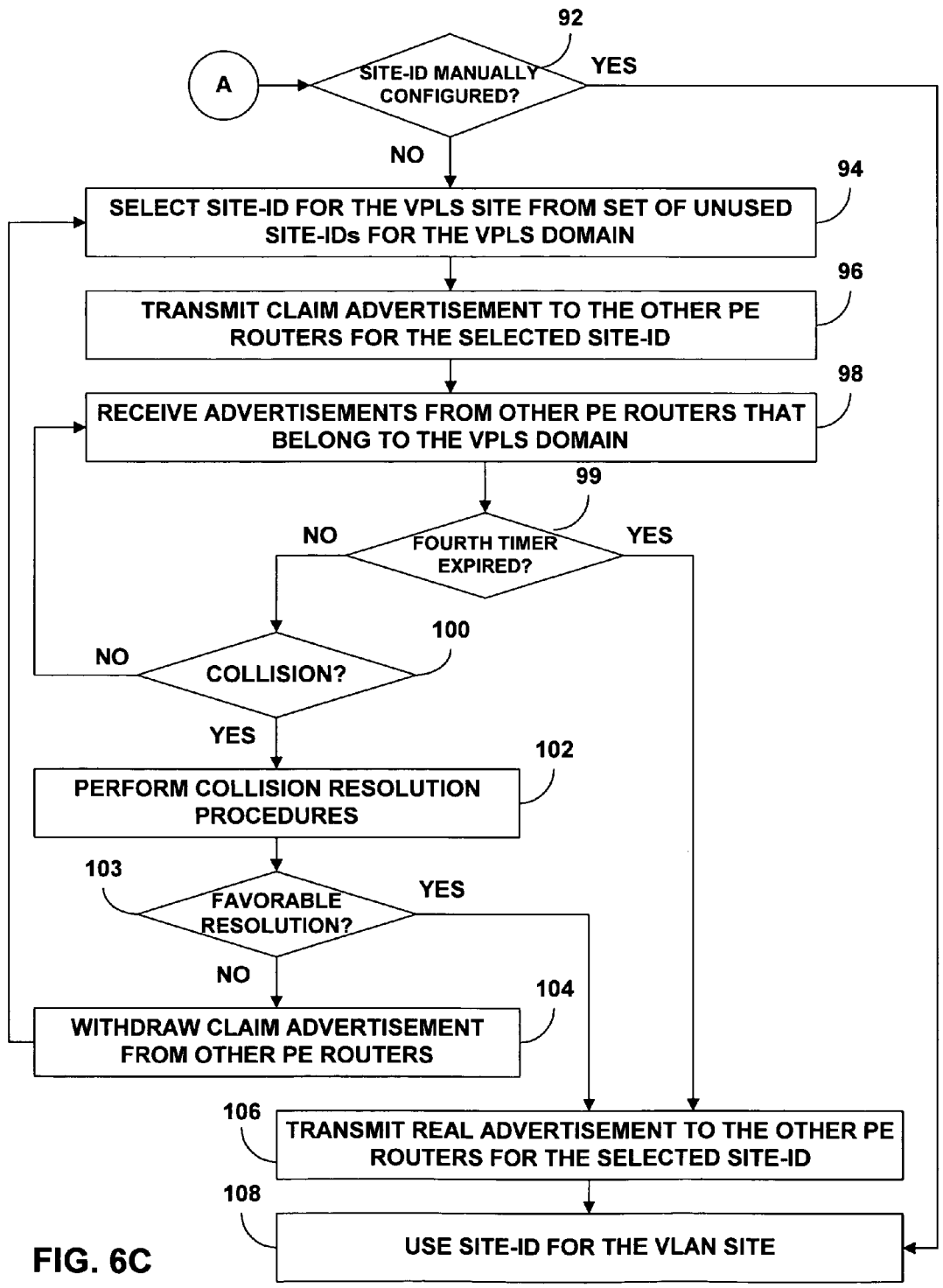

FIGS. 6A-6C are flowcharts illustrating an exemplary process of automatically selecting a site-ID for a customer site of a VPLS domain. As described above, a VPN may comprise a VPLS domain, i.e., a point-to-multipoint L2 VPN. A VPLS domain emulates a LAN and transports L2 traffic (e.g., Ethernet packets) between customer sites via a public network as if the customer sites are included in the same LAN. The process will be described herein in reference to PE router 20 from FIG. 2.

FIG. 6A illustrates configuring customer sites on PE router 20 when newly active. A network service provider configures PE router 20 to belong to one or more VPLS domains (78) and activates PE router 20 (79). VPN module 30 included in PE router 20 configures a customer site (i.e., a VPLS site) for each customer site of the VPLS domains connected to PE router 20 (80). Control unit 22 included in PE router 20 then receives advertisements from other PE routers within the network that belong to the same VPLS domains as PE router 20 (82). The advertisements may comprise BGP advertisements that include site-IDs, control flags, label block sizes, local preferences, and next-hop values. VPN module 30 then stores the information included in the received advertisements in VPN database 36 of PE router 20 (84). Control unit 22 determines whether first timer 35A has expired (85). If first timer 35A has not yet expired, control unit 22 continues to receive advertisements from the other PE routers within the VPLS domains (82).

Similarly, FIG. 6B illustrates configuring customer sites on PE router 20 when currently active. VPN module 30 configures a customer site (i.e., a VPLS site) of a specific VPLS domain on PE router 20 (86). Control unit 22 receives advertisements from other PE routers within the network that belong to the specific VPLS domain (88). The advertisements may comprise BGP advertisements that include site-IDs, control flags, label block sizes, local preferences, and next-hop values. VPN module 30 then stores the information included in the received advertisements in VPN database 36 (90). Control unit 22 determines whether second timer 35B has expired (91). If second timer 35B has not yet expired, control unit 22 continues to receive advertisements from the other PE routers within the specific one of VPLS domains (88).

As illustrated in FIG. 6C, if either first timer 35A has expired (yes branch of 85 from FIG. 6A) or second timer 35B has expired (yes branch of 91 from FIG. 6B), control unit 22 determines whether a site-ID for the VPLS site configured on PE router 20 has been manually configured (92). If the site-ID has been manually configured, control unit 22 may use the manually configured site-ID for the VLAN site (106). If the site-ID has not been manually configured, site-ID allocation module 34 included in control unit 22 selects a site-ID for the VPLS site configured on PE router 20 from a set of unused site-IDs for the specific VPLS domain (94). Site-ID allocation module 34 generates the set of unused site-IDs based on the advertisements received from the other PE routers.

Control unit 22 then transmits a claim advertisement for the selected site-ID to the other PE routers within the specific VPLS domain (96). In return, control unit 22 receives advertisements from the other PE routers that belong to the specific VPLS domain (98). Control unit 22 determines whether fourth timer 35D has expired (99). If fourth timer 35D has expired, control unit 22 transmits a real advertisement for the selected site-ID to the other PE router within the specific VPLS domain (104). Control unit 22 then uses the selected site-ID for the VLAN site configured on PE router 20 (106).

If fourth timer 35D has not yet expired, collision resolution module 32 included in control unit 22 determines whether a collision occurs between the claim advertisement transmitted from PE router 20 and a received advertisement from one of the other PE routers within the specific VPLS domain (100). A collision occurs when a site-ID included in one of the received advertisements is the same as the selected site-ID included in the claim advertisement. If a collision is not detected, control unit 22 continues to receive advertisements from the other PE routers and compare the received advertisements with the claim advertisement until fourth timer 35D has expired.

If a collision is detected, collision resolution module 32 performs collision resolution procedures (102). When collision resolution module 32 does not resolve the collision in favor of PE router 20 (no branch of 103), control unit 22 withdraws the claim advertisement from the other PE routers within the VPLS domain (104). Site-ID allocation module 34 then selects another site-ID for the VPLS site configured on PE router 20 from the set of unused site-IDs for the specific VPLS domain (94). When collision resolution module 32 resolves the collision in favor of PE router 20 (yes branch of 103), control unit 22 transmits a real advertisement with a non-zero label block size for the selected site-ID to the other PE router within the specific VPLS domain (106). Control unit 22 then uses the selected site-ID for the VPLS site configured on PE router 20 (108).

Figure 7:
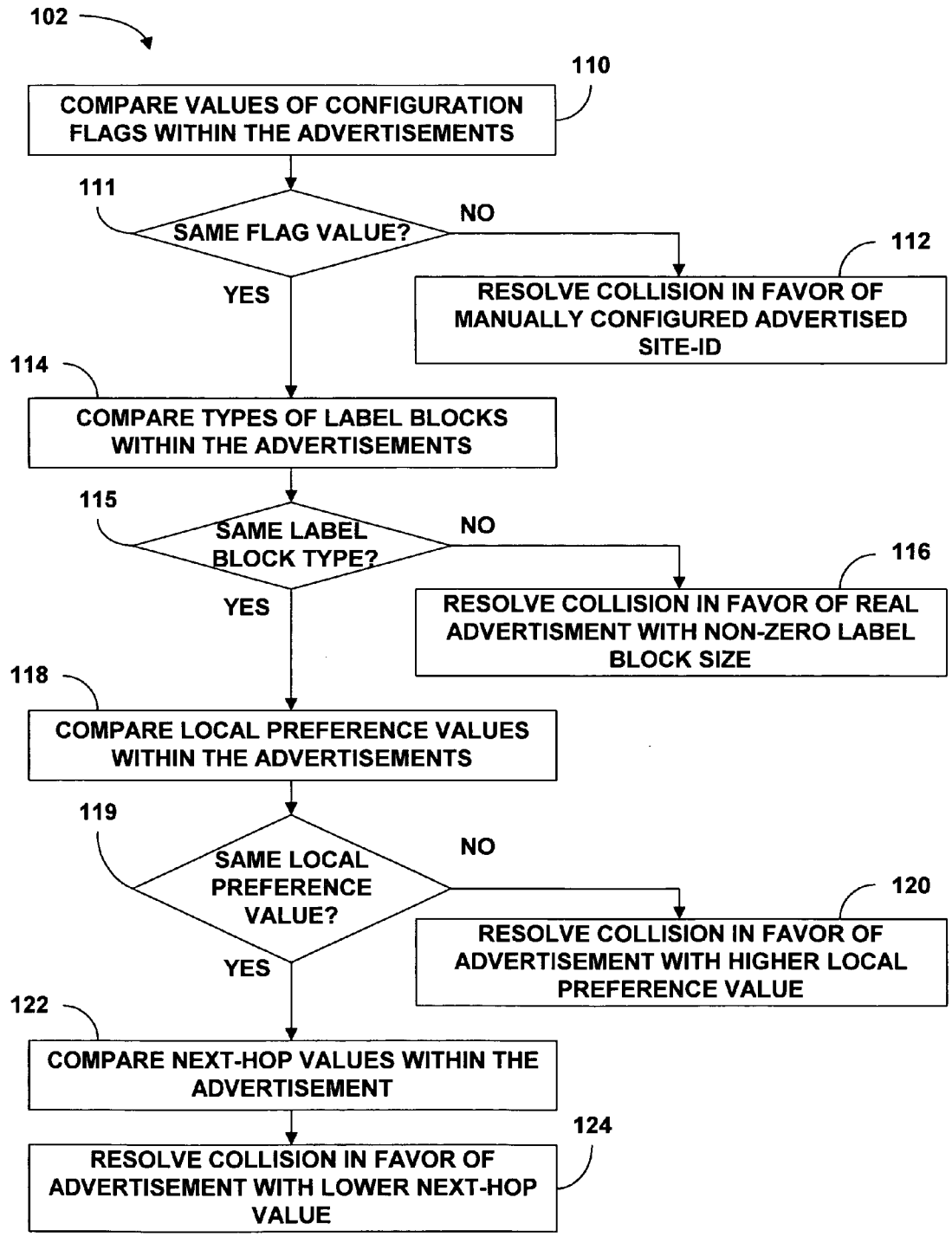
FIG. 7 is a flowchart illustrating an exemplary process of performing collision resolution procedures in greater detail

FIG. 7 is a flowchart illustrating an exemplary process of performing collision resolution procedures (step 102 from FIG. 6B) in greater detail. The process will be described herein in reference to PE router 20 from FIG. 2. As described above, collision resolution module 32 performs the collision resolution procedures on the claim advertisement transmitted from PE router 20 and a received advertisement from one of the other PE routers within the specific VPLS domain. The advertisements include site-IDs, control flags, label block sizes, local preferences, and next-hop values.

First, collision resolution module 32 compares values of configuration flags within both of the advertisements (110). The configuration flags include 'A' bit values that indicate whether the site-ID included in the associated advertisement is manually configured by the network service provider, i.e., A=0, or automatically selected by a PE router, i.e., A=1. If the two advertisements have different 'A' bit values (no branch of 111), collision resolution module 32 resolves the collision in favor of the PE router with the advertisement that includes the manually configured site-ID with A=0 (112).

If both advertisements have the same 'A' bit values (yes branch of 111), collision resolution module 32 compares types of label blocks within both of the advertisements (114). The types of label blocks indicate whether the associated advertisement is a claim advertisement with a label block size of zero, or a real advertisement with a non-zero label block size. If the two advertisements have different types of label blocks (no branch of 115), collision resolution module 32 resolves the collision in favor of the PE router with the real advertisement that includes a non-zero label block size (116).

If both advertisements have the same type of label blocks (yes branch of 115), collision resolution module 32 compares local preference values within both of the advertisements (118). If the two advertisements have different local preference values (no branch of 119), collision resolution module 32 resolves the collision in favor of the PE router with the advertisement that includes the higher local preference value (120).

If both advertisements have the same local preference value (yes branch of 119), collision resolution module 32 compares next-hop values within both of the advertisements (122). The next-hop values comprise addresses of next-hop destination devices, such that each next-hop value is a unique value. Therefore, collision resolution module 32 resolves the collision in favor of the PE router with the advertisement that includes the lower next-hop value (124).

Figure 8:
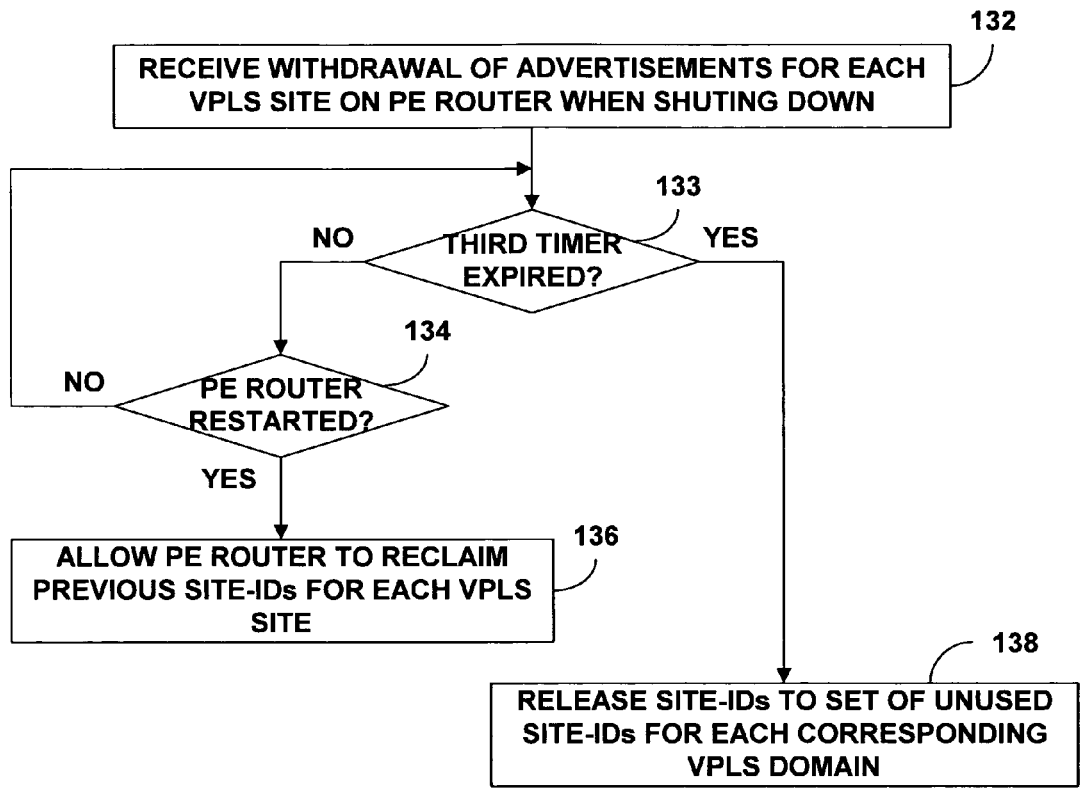
FIG. 8 is a flowchart illustrating an exemplary process of managing site-IDs of VPNs when a PE router restarts.

FIG. 8 is a flowchart illustrating an exemplary process of managing site-IDs of VPNs when a PE router restarts. The process will be described herein in reference to PE routers 4 within service provider network 2 from FIG. 1. In addition, the process will be described in the context of VPLS. Each of PE routers 4 may operate substantially similar to PE router 20 from FIG. 2. As described above, PE router 4A, for example, sends advertisements that indicate site-IDs for each VPLS site (e.g., customer site 8A and customer site 10A) configured on PE router 4A to the other PE routers 4B and 4C within the corresponding VPLS domains.

When PE router 4A shuts down, PE routers 4B and 4C receive withdrawal of all the advertisements for VPLS sites 8A and 10A configured on PE router 4A (132). PE routers 4B and 4C then determine whether a third timer within each of PE routers 4B and 4C has expired (133). The third timer within each of PE routers 4B and 4C may be substantially similar to third timer 35C within PE router 20 from FIG. 2. Until the third timer expires, PE routers 4B and 4C monitor PE router 4A to determine whether PE router 4A has restarted (134).

If PE router 4A restarts before the third timer expires, PE routers 4B and 4C allow PE router 4A to reclaim the previous site-IDs for VPLS sites 8A and 10A configured on PE router 4A as used before PE router 4A shut down (136). If PE router 4A does not restart before the third timer expires, PE routers 4B and 4C release the site-IDs to the set of unused site-IDs for each of the corresponding VPLS domains to which PE router 4A belonged (138). If PE router 4A restarts after the third timer in each of PE routers 4B and 4C expires, PE router 4A may not be able to reclaim the site-IDs previously used for the VPLS sites 8A and 10A configured on PE router 4A. PE router 4A then selects new site-IDs for VPLS sites 8A and 10A from the set of unused site-IDs for the corresponding VPLS domains.

Figure 9:
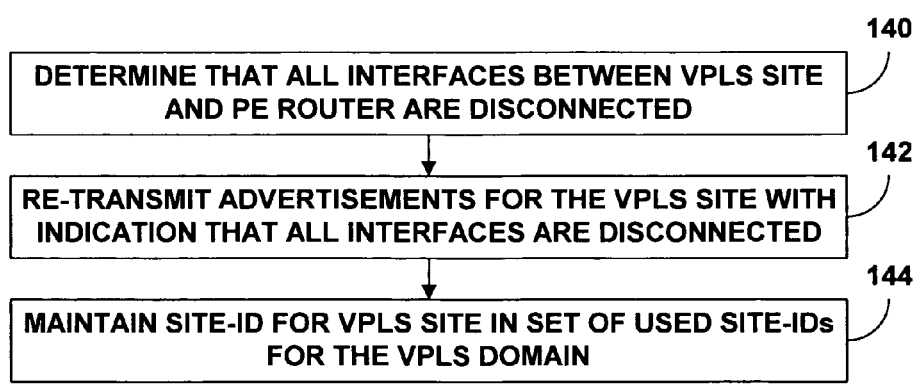
FIG. 9 is a flowchart illustrating an exemplary process of indicating disconnected interfaces between a customer site and a PE router.

FIG. 9 is a flowchart illustrating an exemplary process of indicating disconnected interfaces between a customer site and a PE router. The process will be described herein in reference to PE router 20 from FIG. 2. In addition, the process will be described in the context of VPLS. Control unit 22 determines that at all of a plurality of interfaces between a VPLS site of a specific VPLS domain and PE router 20 are disconnected (140).

After determining the disconnection, control unit 22 re-transmits advertisements for the VPLS site to the other PE routers that belong to the specific VPLS domain. The re-transmitted advertisement includes an indication that all of the plurality of interfaces are disconnected (142). The indication may comprise a disconnect flag within control flags included in the advertisement. For example, the disconnect flag may indicate that at least one of the plurality of interfaces is connected when set to a value of zero and that all of the plurality of interfaces are disconnected when set to a value of one. In another embodiment, control unit 22 may determine that at least one of the plurality of interfaces is disconnected. In that case, the disconnect flag may indicate that all of the plurality of interfaces are connected when set to a value of zero and that at least one of the plurality of interfaces is disconnected when set to a value of one.

Upon receiving the re-transmitted advertisement with the disconnect flag, the other PE routers that belong to the specific VPLS domain remove the pseudo-wires coupled to PE router 20. The other PE routers within the VPLS domain continue to maintain the site-ID of the VPLS site on PE router 20 in the set of used site-IDs for the specific VPLS domain even while all of the plurality of interfaces between the VPLS site and PE router 20 are disconnected (144). In this way, the other PE routers within the specific VPLS domain consider the site-ID of the VPLS site included in the re-transmitted advertisement to still be in use.

The automatic VPN site-ID selection techniques described herein may be backward compatible with conventional manual configuration techniques. In other words, the network system provider may manually configure site-IDs for some customer sites of a given VPN and PE routers within the VPN may automatically select site-IDs for other customer sites of the same VPN. For example, the network service provider may manually configure site-IDs when a customer site is multi-homed to two or more PE routers. In this case, the customer site may be configured on each of the PE routers with the same site-ID. Since the automatic site-ID selection techniques only generate unique site-IDs, the network service provider explicitly configures site-IDs for multi-homed customer sites.

Furthermore, the service provider network may include PE routers that do not support functionality for automatic site-ID selection. For example, the service provider network may comprise a multi-vendor network in which one or more of the vendors do not support this functionality. The service provider network may also include some PE routers with older versions of software that do not support this functionality. The network service provider explicitly configures site-IDs for customer site configured on these PE routers.

As described above, customer sites with manually configured site-IDs are always able to use the site-IDs. For example, if a PE router automatically selects a site-ID for a customer site that conflicts with a manually configured site-ID for a customer site of the same VPN, the PE router stops using the site-ID and selects another site-ID from the set of unused site-IDs for the VPN. In addition, the compatibility of the automatic site-ID selection techniques with PE routers that do not support this functionality may rely on ignoring claim advertisements, which have a label block size of zero, for the automatically selected site-IDs.

Although the techniques have been described herein as automatically selecting site-IDs for customer sites of a VPN established across a single autonomous system (AS). In other embodiments, the automatic site-ID selection techniques may be extended to automatically select site-IDs for customer sites of a VPN established across multiple autonomous systems. In this case, the period of time that a PE router within the multi-AS VPN waits to receive advertisements from other PE routers within the multi-AS VPN may be increased. Furthermore, the techniques described herein ensure that the automatically generated site-IDs are unique across AS boundaries. However the network service provider of each AS that includes customer sites of the VPN must ensure that manually configured site-IDs within one AS do not conflict with manually configured site-IDs within another AS.

Various embodiments of the invention have been described. These and other embodiments are within the scope of the following claims.

The invention claimed is:

1. A method comprising:
receiving a plurality of routing protocol advertisements with a first network device from a plurality of other network devices within an existing virtual private network (VPN) to which the first network device belongs, wherein the advertisements include site-IDs currently used by the plurality of other network devices for identifying customer sites that are already configured on the plurality of other network devices for the VPN;
configuring a new customer site of the VPN on the first network device;
automatically selecting, from a set of unused site-IDs, a unique site-ID for the new customer site of the VPN based on the site-IDs included within the received advertisements;
transmitting a claim advertisement for the selected site-ID with the first network device to the plurality of other network devices within the VPN; and
determining, with the first network device, that a collision of site identifiers has occurred and that the site-ID selected for the new customer site conflicts with a site identifier currently used by one of the other routers for a different customer site of the VPN when the first network device receives a routing protocol advertisement from one of the plurality of other network devices that includes the selected site identifier during a predetermined period of time after transmitting the claim advertisement;
upon determining that a collision has occurred, perform collision resolution by:
comparing values of configuration flags included in the claim advertisement from the first network device and the one of the received advertisements from one of the plurality of other network devices within the VPN;
resolving the collision in favor of the network device with the advertisement that includes the configuration flag indicating a manually configured site-ID when the configuration flags do not have the same value;
comparing types of label blocks included in the claim advertisement and the one of the received advertisements when the configuration flags have the same value;
resolving the collision in favor of the network device with the advertisement that includes the type of label block indicating a real advertisement with a non-zero label block size when the types of label blocks are not the same;

comparing local preference values included in the claim advertisement and the one of the received advertisements when the types of label blocks are the same;
resolving the collision in favor of the network device with the advertisement that includes a higher local preference value when the local preference values are not the same;
comparing next-hop values included in the claim advertisement and the one of the received advertisements when the local preference values are the same; and
resolving the collision in favor of the network device with the advertisement that includes a lower next-hop value.

2. The method of claim 1, further comprising:
configuring the first network device to belong to a plurality of VPNs; and
receiving routing protocol advertisements with the first network device from the plurality of other network devices within each of the plurality of VPNs, wherein the routing protocol advertisements include the site-IDs for customer sites of each of the plurality of VPNs configured on the plurality of other network devices.

3. The method of claim 1, wherein the first network device comprises a newly active network device, and wherein receiving the advertisements comprises receiving the advertisements during a first predetermined period of time prior to automatically selecting the unique site-ID for the new customer site.

4. The method of claim 1, wherein the first network device comprises a currently active network device, and wherein receiving the advertisements comprises receiving the advertisements during a second predetermined period of time prior to automatically selecting the unique site-ID for the new customer site.

5. The method of claim 1, further comprising storing information included in the received advertisements in a database within the first network device.

6. The method of claim 1, wherein the received advertisements include site-IDs, control flags, label block sizes, local preferences, and next-hop values.

7. The method of claim 1, further comprising:
generating the set of unused site-IDs for the VPN to which the first network device belongs based on the received advertisements; and
automatically selecting the site-ID for the new customer site from the set of unused site-IDs for the VPN.

8. The method of claim 7, wherein generating the set of unused site-IDs comprises:
generating a set of used site-IDs for the VPN based on the received advertisements; and
comparing the set of used site-IDs with a set of potential site-IDs for the VPN.

9. The method of claim 7, wherein automatically selecting the site-ID comprises automatically selecting the site-ID from the set of unused site-IDs in a sequential manner.

10. The method of claim 7, wherein automatically selecting the site-ID comprises automatically selecting the site-ID from a portion of the set of unused site-IDs in a random manner.

11. The method of claim 1, wherein automatically selecting the site-ID comprises automatically selecting the site-ID for the new customer site to be substantially dense with the site-IDs included in the received advertisements.

12. The method of claim 1, further comprising transmitting an advertisement for the selected site-ID with the first network device to the plurality of other network devices within the VPN.

13. The method of claim 12, wherein transmitting the advertisement comprises transmitting the advertisement with one of the border gateway protocol (BGP) or the label distribution protocol (LDP).

14. The method of claim 1, wherein determining whether a collision occurs comprises:
comparing site-IDs included in the received advertisements with the selected site-ID for the new customer site; and
detecting a collision when a site-ID included in one of the received advertisements is the same as the selected site-ID.

15. The method of claim 14, further comprising transmitting a real advertisement for the selected site-ID with the first network device to the plurality of other network devices within the VPN and using the selected site-ID for the new customer site when a collision is not detected.

16. The method of claim 1, further comprising transmitting a real advertisement for the selected site-ID with the first network device to the plurality of other network devices within the VPN and using the selected site-ID for the new customer site when the collision is resolved in favor of the first network device.

17. The method of claim 1, further comprising withdrawing the claim advertisement from the plurality of other network devices within the VPN and selecting another site-ID for the new customer site configured on the first network device when the collision is not resolved in favor of the first network device.

18. The method of claim 1, further comprising:
receiving withdrawal of advertisements with the plurality of other network devices within the VPN, wherein the advertisements include site-IDs for customer sites configured on the first network device when the first network device is shutting down;
allowing the first network device to reclaim the same site-IDs for the customer sites when the first network device restarts during a predetermined period of time after withdrawal of the advertisements; and
releasing the site-IDs when the first network device does not restart during the predetermined period of time after withdrawal of the advertisements.

19. The method of claim 1, further comprising:
determining that all of a plurality of interfaces between the new customer site and the first network device are disconnected;
transmitting an advertisement for the selected site-ID that includes an indication that all of the plurality of interfaces are disconnected; and
maintaining the site-ID for the new customer site within a set of used site-IDs for the VPN while all of the plurality of interfaces are disconnected.

20. The method of claim 1, further comprising:
determining that at least one of a plurality of interfaces between the new customer site and the first network device is disconnected;
transmitting an advertisement for the selected site-ID that includes an indication that the at least one of the plurality of interfaces is disconnected; and
maintaining the site-ID for the new customer site within a set of used site-IDs for the VPN while the at least one of the plurality of interfaces is disconnected.

21. The method of claim 1, wherein the VPN comprises a virtual private local area network service (VPLS) domain and the customer sites comprise VPLS sites.

22. The method of claim 1, wherein the network devices comprise routers.

23. A non-transitory computer-readable medium comprising instructions that cause a programmable processor to:
receive a plurality of routing protocol advertisements with a first network device from a plurality of other network devices within an existing virtual private network (VPN) to which the first network device belongs, wherein the advertisements include site-IDs for customer sites of the VPN configured on the plurality of other network devices;
configure a new customer site of the VPN on the first network device;
automatically select, from a set of unused site-IDs, a unique site-ID for the new customer site of the VPN based on the received advertisements;
transmit a claim advertisement for the selected site-ID with the first network device to the plurality of other network devices within the VPN; and
determine, with the first network device, that a collision of site identifiers has occurred and that the site-ID selected for the new customer site conflicts with a site identifier currently used by one of the other routers for a different customer site of the VPN when the first network device receives a routing protocol advertisement from one of the plurality of other network devices that includes the selected site identifier during a predetermined period of time after transmitting the claim advertisement;
upon determining that a collision has occurred, perform collision resolution by:
comparing values of configuration flags included in the claim advertisement from the first network device and the one of the received advertisements from one of the plurality of other network devices within the VPN;
resolving the collision in favor of the network device with the advertisement that includes the configuration flag indicating a manually configured site-ID when the configuration flags do not have the same value;
comparing types of label blocks included in the claim advertisement and the one of the received advertisements when the configuration flags have the same value;
resolving the collision in favor of the network device with the advertisement that includes the type of label block indicating a real advertisement with a non-zero label block size when the types of label blocks are not the same;
comparing local preference values included in the claim advertisement and the one of the received advertisements when the types of label blocks are the same;
resolving the collision in favor of the network device with the advertisement that includes a higher local preference value when the local preference values are not the same;
comparing next-hop values included in the claim advertisement and the one of the received advertisements when the local preference values are the same; and
resolving the collision in favor of the network device with the advertisement that includes a lower next-hop value.

24. The computer-readable medium of claim 23, further comprising instructions that cause the programmable processor to:
generate the set of unused site-IDs for the VPN to which the first network device belongs based on the received advertisements; and
automatically select the site-ID for the new customer site from the set of unused site-IDs for the VPN.

25. The computer-readable medium of claim 23, wherein the instructions that cause the programmable processor to determine whether a collision occurs cause the programmable processor to:
compare site-IDs included in the received advertisements with the selected site-ID for the new customer site; and
detect a collision when a site-ID included in one of the received advertisements is the same as the selected site-ID.

26. The computer-readable medium of claim 25, further comprising instructions that cause the programmable processor to:
transmit a real advertisement for the selected site-ID with the first network device to the plurality of other network devices within the VPN and using the selected site-ID for the new customer site when a collision is not detected; and
perform collision resolution procedures with the first network device when a collision is detected.

27. The computer readable medium of claim 23, further comprising instructions that cause the programmable processor to:
receive withdrawal of advertisements with the plurality of other network devices within the VPN, wherein the advertisements include site-IDs for customer sites configured on the first network device when the first network device is shutting down;
allow the first network device to reclaim the same site-IDs for the customer sites when the first network device restarts during a predetermined period of time after withdrawal of the advertisements; and
release the site-IDs when the first network device does not restart during the predetermined period of time after withdrawal of the advertisements.

28. The computer-readable medium of claim 23, further comprising instructions that cause the programmable processor to:
determine that all of a plurality of interfaces between the new customer site and the first network device are disconnected;
transmit an advertisement for the selected site-ID that includes an indication that all of the plurality of interfaces are disconnected; and
maintain the site-ID for the new customer site within a set of used site-IDs for the VPN while all of the plurality of interfaces are disconnected.

29. The computer-readable medium of claim 23, further comprising instructions that cause the programmable processor to:
determine that at least one of a plurality of interfaces between the new customer site and the first network device is disconnected;
transmit an advertisement for the selected site-ID that includes an indication that the at least one of the plurality of interfaces is disconnected; and
maintain the site-ID for the new customer site within a set of used site-IDs for the VPN while the at least one of the plurality of interfaces is disconnected.

30. A first network device comprising:
a control unit that receives a plurality of routing protocol advertisements from a plurality of other network devices within an existing virtual private network (VPN) to which the first network device belongs, wherein the advertisements include site-IDs for customer sites of the VPN configured on the plurality of other network devices;
a VPN module included in the control unit that configures a new customer site of the VPN on the first network device;
a site-ID allocation module included in the control unit that automatically selects, from a set of unused site-IDs, a unique site-ID for the new customer site of the VPN based on the received advertisements;

a collision resolution module included in the control unit that determines whether a collision occurs based on advertisements received from the plurality of other network devices during a predetermined period of time after the control unit transmits the claim advertisement, wherein the collision resolution module:

compares values of configuration flags included in the claim advertisement from the first network device and the one of the received advertisements from one of the plurality of other network devices within the VPN;

resolves the collision in favor of the network device with the advertisement that includes the configuration flag indicating a manually configured site-ID when the configuration flags do not have the same value;

compares types of label blocks included in the claim advertisement and the one of the received advertisements when the configuration flags have the same value;

resolves the collision in favor of the network device with the advertisement that includes the type of label block indicating a real advertisement with a non-zero label block size when the types of label-blocks are not the same;

compares local preference values included in the claim advertisement and the one of the received advertisements when the types of label blocks are the same;

resolves the collision in favor of the network device with the advertisement that includes a higher local preference value when the local preference values are not the same;

compares next-hop values included in the claim advertisement and the one of the received advertisements when the local preference values are the same; and resolves the collision in favor of the network device with the advertisement that includes a lower next-hop value.

31. The first network device of claim 30, wherein the first network device belongs to a plurality of VPNs, the control unit receives advertisements from a plurality of other network devices within each of a plurality of VPNs, wherein the advertisements include site-IDs for customer sites of each of the plurality of VPNs configured on the plurality of other network devices.

32. The first network device of claim 30, wherein the first network device comprises a newly active network device, and wherein the control unit receives the advertisements from the plurality of other network devices during a first predetermined period of time before the site-ID allocation module automatically selects the unique site-ID for the new customer site.

33. The first network device of claim 30, wherein the first network device comprises a currently active network device, and wherein the control unit receives advertisements from the plurality of other network devices during a second predetermined period of time before the site-ID allocation module automatically selects the unique site-ID for the new customer site.

34. The first network device of claim 30, wherein the VPN module stores information included in the received advertisements in a database included in the control unit, wherein the received advertisements include site-IDs, control flags, label block sizes, local preferences, and next-hop values.

35. The first network device of claim 30, wherein the site-ID allocation module generates a set of unused site-IDs for the VPN based on the received advertisements, and automatically selects the site-ID for the new customer site from the set of unused site-IDs for the VPN.

36. The first network device of claim 35, wherein the VPN site-ID allocation module automatically selects the site-ID from the set of unused site-IDs in a sequential manner.

37. The first network device of claim 35, wherein the site-ID allocation module automatically selects the site-ID from a portion of the set of unused site-IDs in a random manner.

38. The first network device of claim 30, wherein the site-ID allocation module automatically selects the site-ID for the new customer site to be substantially dense with the site-IDs included in the received advertisements.

39. The first network device of claim 30, wherein the control unit transmits a claim advertisement for the selected site-ID to the plurality of other network devices within the VPN.

40. The first network device of claim 39, wherein the control unit uses one of the border gateway protocol (BGP) or the label distribution protocol (LDP) to transmit the advertisement.

41. The first network device of claim 30, wherein the collision resolution module compares site-IDs included in the received advertisements with the selected site-ID for the new customer site, and detects a collision when a site-ID included in one of the received advertisements is the same as the selected site-ID.

42. The first network device of claim 41,
wherein the control unit transmits a real advertisement for the selected site-ID to the plurality of other network devices within the VPN and uses the selected site-ID for the new customer site when a collision is not detected, and
wherein the collision resolution module performs collision resolution procedures when a collision is detected.

43. The first network device of claim 42, wherein the control unit transmits a real advertisement for the selected site-ID to the plurality of other network devices within the VPN and uses the selected site-ID for the new customer site when the collision resolution module resolves the collision in favor of the first network device.

44. The first network device of claim 42,
wherein the control unit withdraws the claim advertisement from the plurality of other network devices within the VPN when the collision resolution module does not resolve the collision in favor of the first network device, and
wherein the site-ID allocation module selects another site-ID for the new customer site.

45. The first network device of claim 32, wherein the configuration flag included in an advertisement indicates a manually configured site-ID when set to a value of zero and indicates an automatically generated site-ID when set to a value of one.

46. The first network device of claim 32, wherein the type of label block included in an advertisement indicates a claim advertisement when set to a zero label block size and indicates a real advertisement when set of a non-zero label block size.

47. The first network device of claim 30,
wherein the control module withdraws advertisements including site-IDs for customer sites configured on the first network device when the first network device is shutting down,
wherein the plurality of other network devices within the VPN allow the first network device to reclaim the same site-IDs for the customer sites when the first network device restarts during a predetermined period of time after withdrawal of the advertisements, and wherein the plurality of other network device within the VPN release the site-IDs when the first network device does not restart during the predetermined period of time after withdrawal of the advertisements.

48. The first network device of claim 30,
wherein the control unit determines that all of a plurality of interfaces between the new customer site and the first network device are disconnected, and transmits an advertisement for the selected site-ID including an indication that all of the plurality of interfaces are disconnected, and
wherein the plurality of other network devices within the VPN maintain the site-ID for the new customer site on the first network device within a set of used site-IDs for the VPN while all of the plurality of interfaces are disconnected.

49. The first network device of claim 48, wherein the indication included in the advertisement comprises a disconnect flag that indicates at least one of the plurality of interfaces are connected when set to a value of zero, and indicates all of the plurality of interfaces are disconnected when set of a value of one.

50. The first network device of claim 30,
wherein the control unit determines that at least one of a plurality of interfaces between the new customer site and the first network device is disconnected, and transmits an advertisement for the selected site-ID including an indication that the at least one of the plurality of interfaces is disconnected, and
wherein the plurality of other network devices within the VPN maintain the site-ID for the new customer site on the first network device within a set of used site-IDs for the VPN while the at least one of the plurality of interfaces is disconnected.

51. The first network device of claim 50, wherein the indication included in the advertisement comprises a disconnect flag that indicates all of the plurality of interfaces are connected when set to a value of zero, and indicates at least one of the plurality of interfaces is disconnected when set of a value of one.

52. The first network device of claim 30, wherein the VPN comprises a virtual private local area network service (VPLS) and the customer sites comprise VPLS sites.

53. The first network device of claim 30, wherein the network devices comprise routers.

54. A system for automatically selecting virtual private network (VPN) site-IDs, the system comprising:
at least one VPN established over a network;
a plurality of customer sites; and
a plurality of routers,
wherein each of the plurality of routers is coupled to at least one of the plurality of customer sites, and
wherein each of the plurality of routers is configured to belong to at least one of the VPNs, and
wherein each of the plurality of routers is configured to transmit a routing protocol advertisement, each of the advertisements comprising a site-ID for the customer site of the VPN to which the router is configured to belong,
wherein a first router of the plurality of routers automatically selects an unused site-ID for one of the plurality of customer sites to which the first router is coupled when the customer site to which the first router is coupled is a new customer site of the VPN,
wherein, when selecting the site-ID, the first router executes a collision resolution procedure to determine that the site-ID selected for the new customer site conflicts with a site-ID advertised by one of the other routers for a different one of the customer sites during a predetermined period of time after transmitting the claim advertisement; and
wherein the first router performs a resolution procedure with the collision resolution module to use the selected site-ID for the new customer network or select a different unique site-ID for the new customer site.

55. The system of claim 54, wherein each of the plurality of routers uses one of the border gateway protocol (BGP) or the label distribution protocol (LDP) to transmit an advertisement.

56. A method for automatically selecting unique virtual private network site identifiers (site-IDs) for customer sites of a virtual private network comprising:
executing a routing protocol on a processor of a router to exchange routing protocol advertisements with a plurality of other routers within a network, wherein each of the routers is coupled to one or more customer sites of the virtual private network, and wherein the routing protocol advertisements include site identifiers currently assigned to the customer sites by the routers;
executing, on the router, a VPN module that configures a new customer site for the virtual private network;
executing, on the router, a site identifier allocation module that determines a set of unused site identifiers for the virtual private network based on the site identifiers specified within the received routing protocol advertisements and selects a unique site identifier for the new customer site from the set of unused site identifiers for the VPN;
transmitting, with the routing protocol, a routing protocol advertisement to the other routers to claim the selected site identifier for the new customer site;
executing a collision resolution module on the router to determine that the site identifier selected for the new customer site conflicts with a site identifier selected by one of the other routers for a different customer site upon receiving a routing protocol advertisement that includes the selected site identifier; and
performing a resolution procedure with the collision resolution module to use the selected site identifier for the new customer network or select a different unique site identifier for the new customer site.

* * * * *

UNITED STATES PATENT AND TRADEMARK OFFICE
CERTIFICATE OF CORRECTION

PATENT NO. : 7,986,695 B1  
APPLICATION NO. : 11/329371  
DATED : July 26, 2011  
INVENTOR(S) : Kodeboyina et al.

Page 1 of 1

It is certified that error appears in the above-identified patent and that said Letters Patent is hereby corrected as shown below:

Column 20, line 56, "set of a non-zero", should read --set to a non-zero--

Column 21, line 1, "device", should read --devices--

Column 21, line 22, "when set of a", should read --when set to a--

Column 21, line 40, "when set of a", should read --when set to a--

Signed and Sealed this
Twenty-seventh Day of December, 2011

David J. Kappos
*Director of the United States Patent and Trademark Office*